US012650610B2

(12) United States Patent (10) Patent No.: US 12,650,610 B2
Sirowatka et al. (45) Date of Patent: Jun. 9, 2026

(54) DIRECTIONAL VISUAL AND AUDIO COMMUNICATION

(71) Applicant: GM Global Technology Operations LLC, Detroit, MI (US)

(72) Inventors: Brenton John Sirowatka, Clarkston, MI (US); Manoj Kumar Sharma, Troy, MI (US); Kathleen Marie Schuetz, Royal Oak, MI (US); Daniel W. Booth, Bloomfield Hills, MI (US); Joseph F. Szczerba, Grand Blanc, MI (US); Thomas A. Seder, Fraser, MI (US); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 315 days.

(21) Appl. No.: 18/415,141

(22) Filed: Jan. 17, 2024

(65) Prior Publication Data

US 2025/0231417 A1 Jul. 17, 2025

(51) Int. Cl.
G02B 30/33 (2020.01)
B60Q 1/50 (2006.01)
(Continued)

(52) U.S. Cl.
CPC .............. G02B 30/33 (2020.01); B60Q 1/50 (2013.01); B60Q 5/005 (2013.01); G02B 30/56 (2020.01);
(Continued)

(58) Field of Classification Search
CPC ........ G02B 30/33; G02B 30/56; G02B 26/10; G02B 27/0093; G02B 27/0103; G02B 2027/014; G02B 27/00; G02B 27/01; B60Q 1/50; B60Q 5/005; B60Q 5/00; G10L 15/25; G10L 15/005; G10L 15/00; H04N 13/322; H04N 13/366; H04N 13/302;
(Continued)

(56) References Cited

U.S. PATENT DOCUMENTS

| | | |
|---|---|---|
| 2003/0039031 A1 | 2/2003 | Redert |
| 2016/0187654 A1* | 6/2016 | Border .............. G02B 27/0172 |
| | | 359/630 |

(Continued)

FOREIGN PATENT DOCUMENTS

DE 102021207987 A1 1/2023

*Primary Examiner* — Thomas K Pham
*Assistant Examiner* — Kuei-Jen L Edenfield
(74) *Attorney, Agent, or Firm* — Vivacqua Crane, PLLC

(57) ABSTRACT

A system within a vehicle for communicating with a person in proximity to the vehicle includes a perception system in communication with a system controller and adapted to detect the presence of a person, a monitoring system adapted to monitor the position of the person's head and eyes, a holographic image generator including a visual compute engine adapted to calculate a holographic image and encode the holographic image onto a spatial light modulator of a picture generating unit, and a beam steering device, wherein the beam steering device is adapted to receive information related to a position of the person's head and eyes from the monitoring system, and the display is adapted to project the holographic image to the beam steering device and the beam steering device is adapted to re-direct the projected holographic image to the eyes of the person.

20 Claims, 6 Drawing Sheets

(51) Int. Cl.

| | |
|---|---|
| *B60Q 5/00* | (2006.01) |
| *G02B 26/10* | (2006.01) |
| *G02B 30/56* | (2020.01) |
| *G10L 15/25* | (2013.01) |
| *H04N 13/322* | (2018.01) |
| *H04N 13/366* | (2018.01) |
| *H04R 1/02* | (2006.01) |
| *H04R 1/32* | (2006.01) |

(52) U.S. Cl.
CPC ........... *G10L 15/25* (2013.01); *H04N 13/322* (2018.05); *H04N 13/366* (2018.05); *H04R 1/025* (2013.01); *H04R 1/323* (2013.01); *G02B 26/10* (2013.01); *H04R 2499/13* (2013.01)

(58) Field of Classification Search
CPC .. H04N 13/363; H04N 13/383; H04N 13/385; H04N 13/398; H04R 1/025; H04R 1/323; H04R 2499/13; H04R 1/02; H04R 1/32; B60R 1/27
USPC ...................................................... 359/23–24
See application file for complete search history.

(56) References Cited

U.S. PATENT DOCUMENTS

| | | | |
|---|---|---|---|
| 2018/0063484 A1* | 3/2018 | Smits ................... | H04N 13/239 |
| 2018/0072226 A1* | 3/2018 | Bunch ....................... | B60R 1/27 |
| 2018/0173234 A1 | 6/2018 | Van Laack et al. | |
| 2021/0070176 A1* | 3/2021 | Rao .......................... | G09G 3/36 |

* cited by examiner

DIRECTIONAL VISUAL AND AUDIO COMMUNICATION

INTRODUCTION

The present disclosure relates to a system within a vehicle for generating a floating image and audio directed to an individual in proximity to the vehicle.

Current entertainment systems within vehicles generally comprise a screen or monitor that is mounted within the vehicle for viewing by the passengers. Some systems include smaller individual screens, wherein each passenger has a screen for their personal viewing. Some systems include external screens for displaying to persons outside of the vehicle. Known systems incorporate inverse head-up-display architectures that use beams splitters that must be attached to structure within the vehicle compartment and must be constantly re-adjusted to accommodate height and position variations of the passenger within the vehicle compartment.

While current systems achieve their intended purpose, there is a need for a new and improved system for generating a floating image and audio directed to an individual in proximity to the vehicle.

SUMMARY

According to several aspects of the present disclosure, a system within a vehicle for communicating with a person in proximity to the vehicle includes a perception system in communication with a system controller, the perception system adapted to detect the presence of a person in proximity to the vehicle, a monitoring system in communication with the system controller and adapted to monitor the position of the person's head and eyes, a holographic image generator including a visual compute engine in communication with the system controller and the monitoring system and adapted to calculate a holographic image and encode the holographic image to a display of a picture generating unit (PGU) and a beam steering device, wherein, the beam steering device is adapted to receive, via the visual compute engine, information related to a position of the person's head and eyes from the monitoring system, and the display is adapted to project the holographic image to the beam steering device and the beam steering device is adapted to re-direct the projected holographic image to the eyes of the person, based on the information received from the monitoring system.

According to another aspect, the system further includes an audio communication system adapted to support audible communication between the vehicle and the person and including a directional speaker in communication with the system controller and adapted to provide audio output directed to the person, an audio compute engine in communication with the monitoring system, the audio compute engine adapted to use a visual speech recognition algorithm in communication with data received from the monitoring system to visually interpret verbal communications from the person, and a microphone in communication with the system controller and adapted to receive verbal communications from the person.

According to another aspect, the visual compute engine is further adapted to encode a lens function into the holographic image based on information received from the monitoring system.

According to another aspect, the holographic image comprises a single two-dimensional holographic image, and the beam steering device is adapted to re-direct the single two-dimensional holographic image directly to both a right eye of the person and a left eye of the person simultaneously, wherein the person perceives the two-dimensional holographic image floating within the vehicle in front of the person.

According to another aspect, the holographic image comprises a single two-dimensional holographic image, and the beam steering device is adapted to alternately re-direct the single two-dimensional holographic image directly to only a right eye of the person and then only to a left eye of the person, switching back and forth between the right eye and the left eye at a frequency greater than 30 Hz, wherein the person perceives the two-dimensional holographic image floating in front of the person.

According to another aspect, the holographic image includes a right-eye image and a left-eye image, the visual compute engine is adapted to calculate the right-eye image and the left-eye image and to alternately encode the right-eye image onto the display and encode the left-eye image onto the display, switching back and forth between encoding the right-eye image and encoding the left-eye image at a frequency greater than 30 Hz, the display is adapted to project, alternately, at a frequency greater than 30 Hz and in sync with the visual compute engine, the right-eye image and the left-eye image to the beam steering device, and the beam steering device is adapted to, alternately, at a frequency greater than 30 Hz and in sync with the visual compute engine and the display, re-direct the right-eye image directly to the right eye of the person 50 and re-direct the left-eye image directly to the left eye of the person, wherein the right-eye image and the left-eye image are slightly different perspectives of a single image such that when the right eye of the person receives the right-eye image and the left eye of the person receives the left-eye image, the person perceives a three-dimensional image floating in front of the person.

According to another aspect, the beam steering device is one of a microelectromechanical systems (MEMS) mirror, a two galvanometer mirror, a rotating Risley prism pair or a one-dimensional scam mirror in combination with a rotating polygon mirror.

According to another aspect, the holographic image includes a right-eye image and a left-eye image, the display includes a right-eye display and a left-eye display, the beam steering device includes a right-eye mirror and a left-eye mirror, the visual compute engine is adapted to calculate the right-eye image and the left-eye image and to simultaneously encode the right-eye image onto the right-eye display and encode the left-eye image onto the left-eye display, the right-eye display and the left-eye display are adapted to project, simultaneously, the right-eye image to the right-eye mirror and the left-eye image to the left-eye mirror, and the right-eye mirror is adapted to re-direct the right-eye image directly to the right eye of the person, and, simultaneously, the left-eye mirror is adapted to re-direct the left-eye image directly to the left eye of the person, wherein the right-eye image and the left-eye image are slightly different perspectives of a single image such that when the right eye of the person receives the right-eye image and the left eye of the person receives the left-eye image, the person perceives a three-dimensional image floating in front of the person.

According to another aspect, the beam steering device is adapted to alternately re-direct the holographic image only to a first person within proximity of the vehicle and then only to a second person within proximity of the vehicle, switching back and forth between the first person and the second person at a frequency greater than 30 Hz, wherein the first person perceives the holographic image floating in front of the first person and, simultaneously, the second person perceives the holographic image floating in front of the second person, and the audio communication system is adapted to alternately support audible communication between the vehicle and the first person and then support audible communication between the vehicle and the second person, switching back and forth between audible communication with the first person and audible communication with the second person.

According to another aspect, the holographic image includes a first image and a second image, the visual compute engine is adapted to calculate the first image and the second image and to alternately encode the first image onto the display and encode the second image onto the display, switching back and forth between encoding the first image and encoding the second image at a frequency greater than 30 Hz, the display is adapted to project, alternately, at a frequency greater than 30 Hz and in sync with the visual compute engine, the first image and the second image to the beam steering device, and the beam steering device is adapted to, alternately, at a frequency greater than 30 Hz and in sync with the visual compute engine and the display, re-direct the first image directly to a first person within proximity of the vehicle and re-direct the second image directly to a second person within proximity of the vehicle.

According to several aspects of the present disclosure, a method of communicating with a person in proximity to a vehicle includes detecting, with a perception system in communication with a system controller, the presence of a person in proximity to the vehicle, monitoring, with a monitoring system, the position of the person's head and eyes, calculating, with a visual compute engine of a holographic image generator in communication with the monitoring system, a holographic image and encoding the holographic image to a display of a picture generating unit (PGU), receiving, with a beam steering device, via the visual compute engine, information related to a position of the person's head and eyes from the monitoring system, and projecting, with the display, the holographic image to the beam steering device, and, re-directing, with the beam steering device, the projected holographic image to the eyes of the person, based on the information received from the monitoring system.

According to another aspect, the method further includes supporting audible communication between the vehicle and the person with an audio communication system by providing audio output directed to the person with a directional speaker in communication with the system controller, using, with an audio compute engine in communication with the monitoring system, a visual speech recognition algorithm in communication with data received from the monitoring system and visually interpreting verbal communications from the person, and receiving, with a microphone in communication with the system controller, verbal communications from the person.

According to another aspect, the method further includes encoding, with the visual compute engine, a lens function into the holographic image based on information received from the monitoring system.

According to another aspect, the calculating, with the visual compute engine, the holographic image further includes, calculating, with the visual compute engine, a single two-dimensional holographic image, and the re-directing, with the beam steering device, the projected holographic image to the eyes of the person further includes, re-directing, with the beam steering device, the single two-dimensional holographic image directly to both a right eye of the person and a left eye of the person simultaneously, wherein the person perceives the two-dimensional holographic image floating in front of the person.

According to another aspect, the calculating, with the visual compute engine, the holographic image further includes, calculating, with the visual compute engine, a single two-dimensional holographic image, and the re-directing, with the beam steering device, the projected holographic image to the eyes of the person further includes, alternately re-directing, with the beam steering device, the single two-dimensional holographic image directly to only a right eye of the person and then only to a left eye of the person, switching back and forth between the right eye and the left eye at a frequency greater than 30 Hz, wherein the person perceives the two-dimensional holographic image floating in front of the person.

According to another aspect, the holographic image includes a right-eye image and a left-eye image, and the calculating, with the visual compute engine, the holographic image further includes, calculating, with the visual compute engine, the right-eye image and the left-eye image, the encoding the holographic image to the display of the picture generating unit (PGU) further includes alternately encoding, with the visual compute engine, the right-eye image onto the display and encoding, with the visual compute engine, the left-eye image onto the display, and switching back and forth between encoding the right-eye image and encoding the left-eye image at a frequency greater than 30 Hz, the projecting, with the display, the holographic image to the beam steering device further includes projecting, alternately, at a frequency greater than 30 Hz and in sync with the visual compute engine, the right-eye image and the left-eye image to the beam steering device, and the re-directing, with the beam steering device, the projected holographic image to the eyes of the person further includes alternately, at a frequency greater than 30 Hz and in sync with the visual compute engine and the display, re-directing, with the beam steering device, the right-eye image directly to the right eye of the person and re-directing, with the beam steering device, the left-eye image directly to the left eye of the person, wherein the right-eye image and the left-eye image are slightly different perspectives of a single image such that when the right eye of the person receives the right-eye image and the left eye of the person receives the left-eye image, the person perceives a three-dimensional image floating in front of the person.

According to another aspect, the holographic image includes a right-eye image and a left-eye image, the display includes a right-eye display and a left-eye display, and the beam steering device includes a right-eye mirror and a left-eye mirror, wherein, the calculating, with the visual compute engine, the holographic image further includes calculating, with the visual compute engine, the right-eye image and the left-eye image, the encoding the holographic image to the display of the picture generating unit (PGU) further includes simultaneously encoding, with the visual compute engine, the right-eye image onto the right-eye display and encoding, with the visual compute engine, the left-eye image onto the left-eye display, the projecting, with the display, the holographic image to the beam steering device further includes simultaneously projecting, with the right-eye display and the left-eye display, the right-eye image to the right-eye mirror and the left-eye image to the left-eye mirror, and the re-directing, with the beam steering device, the projected holographic image to the eyes of the person further includes re-directing, simultaneously, with the right-eye mirror, the right-eye image directly to the right eye of the person, and, directing, with the left-eye mirror, the left-eye image directly to the left eye of the person, wherein the right-eye image and the left-eye image are slightly different perspectives of a single image such that when the right eye of the person receives the right-eye image and the left eye of the person receives the left-eye image, the person perceives a three-dimensional image floating in front of the person.

According to another aspect, the re-directing, with the beam steering device, the projected holographic image to the eyes of the person further includes alternately, at a frequency greater than 30 Hz and in sync with the visual compute engine and the display, re-directing, with the beam steering device, the holographic image only to a first person within proximity of the vehicle and then only to a second person within proximity of the vehicle, switching back and forth between the first person and the second person at a frequency greater than 30 Hz, and the supporting audible communication between the vehicle and the person with the audio communication system further includes alternately supporting audible communication between the vehicle and the first person and then supporting audible communication between the vehicle and the second person, switching back and forth between supporting audible communication with the first person and supporting audible communication with the second person.

According to another aspect, the holographic image includes a first image and a second image, and the calculating, with the visual compute engine, the holographic image further includes, calculating, with the visual compute engine, the first image and the second image, the encoding the holographic image to the display of the picture generating unit (PGU) further includes alternately encoding, with the visual compute engine, the first image to the display and encoding, with the visual compute engine, the second image to the display, and switching back and forth between encoding the first image and encoding the second image at a frequency greater than 30 Hz, the projecting, with the display, the holographic image to the beam steering device further includes projecting, alternately, at a frequency greater than 30 Hz and in sync with the visual compute engine, the first image and the second image to the beam steering device, and the re-directing, with the beam steering device, the projected holographic image to the eyes of the person further includes alternately, at a frequency greater than 30 Hz and in sync with the visual compute engine and the display, re-directing, with the beam steering device, the first image directly to a first person in proximity to the vehicle and re-directing, with the beam steering device, the second image directly to a second person in proximity to the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
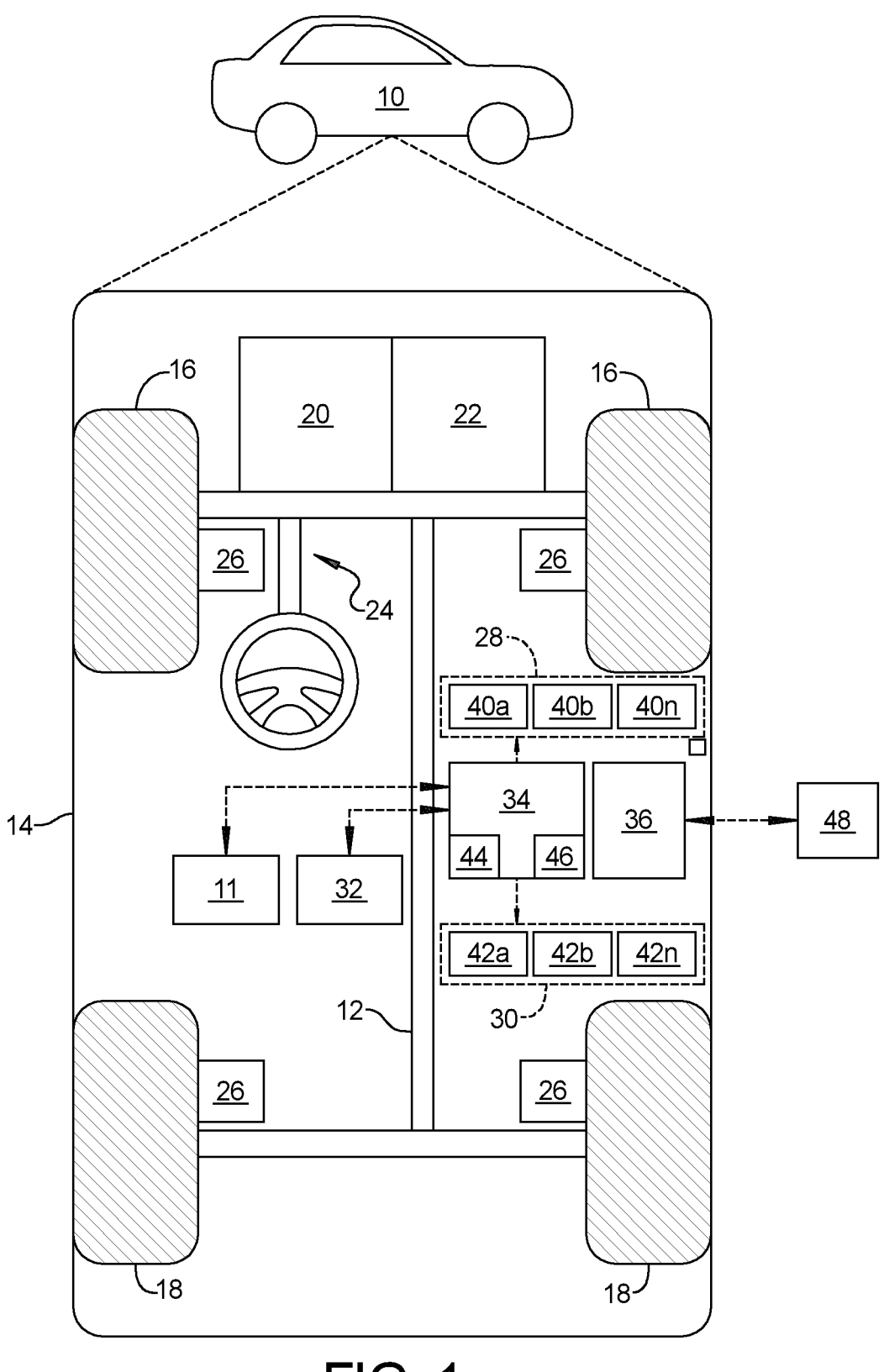
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for generating a floating image and audio directed to a person 50 in proximity to the vehicle 10 in accordance with various embodiments. In general, the system 11 works in conjunction with other systems within the vehicle 10 to display various information and infotainment content for an individual in proximity to the vehicle. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a wireless communication module 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the wireless communication module is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
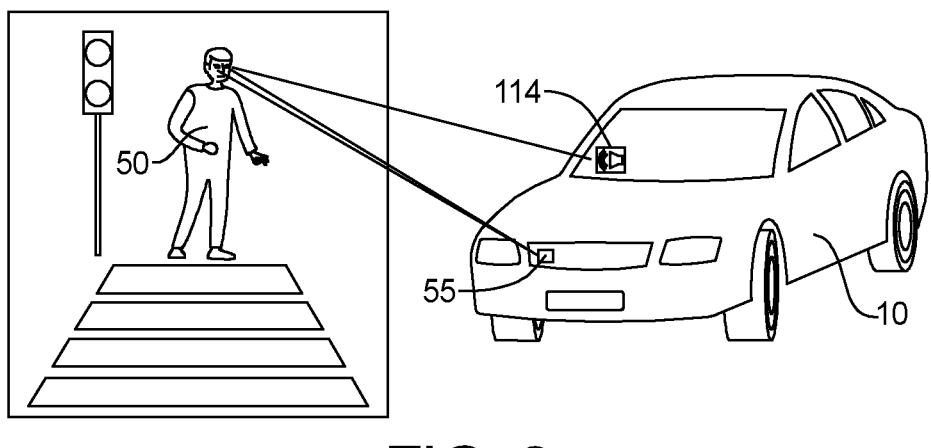
FIG. 2 is a schematic diagram of a vehicle and a person in proximity to the vehicle.

Referring to FIG. 2, the system 11 is adapted to project a holographic image directly to the eyes of a person 50 within proximity of the vehicle 10, wherein only the person 50 can see the holographic image. Further, the system 11 is adapted to provide directional audio to the person 50.

Figure 3:
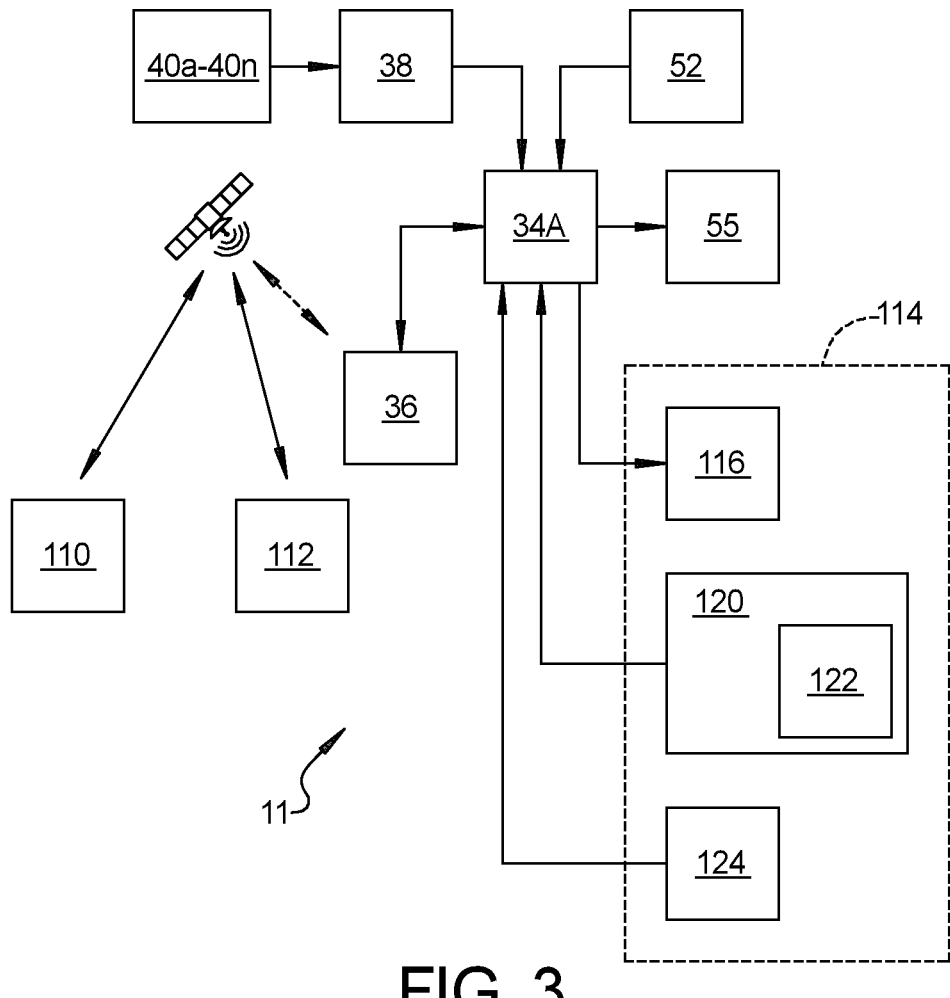
FIG. 3 is a schematic block diagram of a system according to an exemplary embodiment of the present disclosure.
Figures 4, 5:
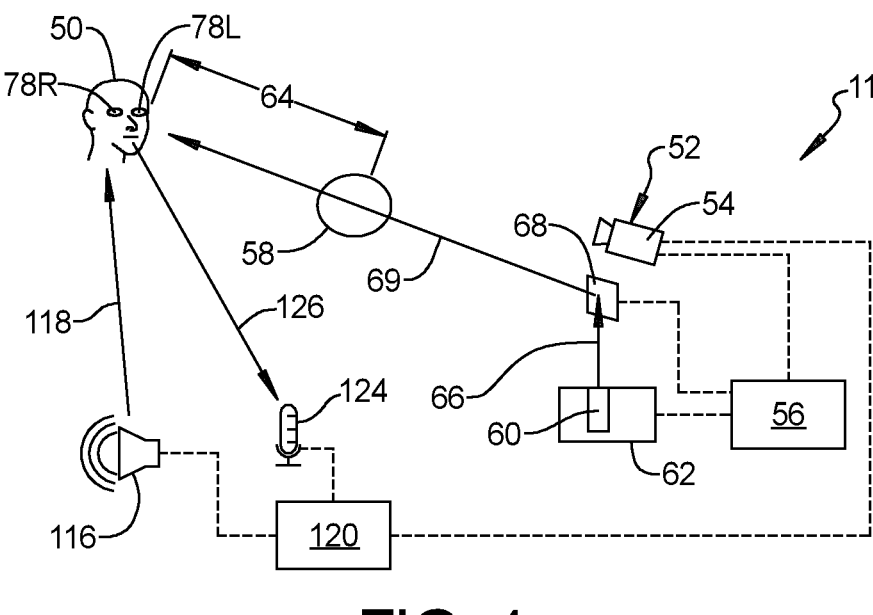
FIG. 4 is a schematic view of a system according to an exemplary embodiment wherein a beam steering device is adapted to project to right and left eyes of a person simultaneously.
FIG. 5 is a schematic view of a system according to an exemplary embodiment wherein a beam steering device is adapted to switch back and forth between right and left eyes of a passenger.

Referring to FIG. 3 and FIG. 4, the system 11 for generating a floating image for a person within proximity of the vehicle 10 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. The system further includes a perception system 38 that uses data from the sensors 40a-40n within the vehicle 10 to identify the presence of a person 50 within proximity to the vehicle 10. The person 50 may be a pedestrian walking or standing within a predetermined distance of the vehicle 10. Alternatively, the person 50 may be an individual located adjacent to the vehicle. Additionally, the person 50 may be an animal along the roadway on which the vehicle 10 is traveling, wherein the system 11 is used to alert/scare the animal to prevent potential vehicle/animal collisions.

The system further includes a monitoring system 52 which includes a camera 54 that is adapted to monitor the position of the person's 50 head and eyes. The monitoring system 52 is an artificial intelligence (AI)-based vehicle safety technology that monitors the person's head and eyes much the same way as a driver monitoring system monitors a driver's attentiveness. The main features of the monitoring system 52 are to detect and identify the person 50 and to monitor the head and eyes of the person 50. Used within the system 11 of the present disclosure, the primary purpose of the monitoring system 52 is to monitor the location of the eyes of the person 50 and the direction of the gaze of the person 50. Once the presence of the person 50 has been detected by the perception system, the system controller 34A uses images from the monitoring system 52 and data received, via the wireless communication module 36, to identify the person 50 and determine if and what type of communication should be initiated with the person 50. Data related to the identity of the person 50 may be received via wireless communication with a personal device 100, such as a cell phone, used by the person 50 or via wireless communication with a vehicle 102 in which the person 50 is located.

The system 11 further includes a holographic image generator 55 that includes a visual compute engine 56 in communication with the monitoring system 52 and adapted to calculate a holographic image 58 (phase hologram) and encode the holographic image 58 to a display 60 of a picture generating unit (PGU) 62. In an exemplary embodiment, the display 60 comprises a spatial light modulator (SLM). It should be understood that other types of displays 60 may be incorporated in the system 11 without departing from the novel features of the present disclosure. The display 60 is irradiated with a light source, such as by way of non-limiting examples, RGB laser light or SLED light sources. When irradiated, each of the display pixels will produce a wavefront having a phase that corresponds to the phase of the position of the hologram encoded at that pixel.

In an exemplary embodiment, the visual compute engine 56 is further adapted to encode a lens function into the holographic image 58 based on information received from the monitoring system 52. The monitoring system 52 gathers information on the exact location of the eyes of the person 50 and determines an appropriate distance 64 at which the holographic image 58 should be perceived by the person 50. The multiple wavefronts exiting the display 60 constructive and destructively interfere with one another revealing an image pattern of the holographic image 58 at the appropriate distance 64 that is tunable by also encoding a lens function into the encoded holographic image. Thus, two pieces of information are encoded into the holographic image 58, the image information and the appropriate distance 64 at which the person 50 should perceive the holographic image 58 (the distance where the wavefronts come together to form the holographic image 58). Tunability of the appropriate distance 64 allows the system 11 to display the holographic image 58 with variable virtual image distance. Holographic images with variable virtual image distance allows the system 11 to project a floating holographic image 58 to the person 50 with the capability of making the floating holographic image 58 appear closer or further away from the person 50.

The light exiting the display 60 travels along a path in a straight line, as indicated by arrow 66 until it encounters a beam steering device 68. In an exemplary embodiment, the beam steering device 68 includes a single turning mirror that is mounted onto an adjustable gimbal mount which receives information from the monitoring system 52, via the visual compute engine 56, and re-directs the holographic image 58 to the person's 50 eye(s), as indicated by arrow 69. The person's 50 corneal lens Fourier transforms the holograms creating an image on the person's 50 retina. The holographic image 58 is perceived in front of the person 50 at the appropriate distance 64 from the person 50, as specified by the lens function encoded into the holographic image 58.

In an exemplary embodiment, the beam steering device 68 includes a microelectromechanical systems device. Micromirror devices are devices based on microscopically small mirrors. The mirrors are microelectromechanical systems (MEMS), which means that their states are controlled by applying a voltage between the two electrodes around the mirror arrays. In other embodiments, the beam steering device 68 includes MEMs technologies based upon electromagnet designs. The beam steering device 68 could be any suitable scanning mirror technology such as, by way of non-limiting examples, a two galvanometer mirror, rotating Risley prism pair or a one-dimensional scan mirror in combination with a rotating polygon mirror.

Digital micromirror devices are used in video projectors and optics and micromirror devices for light deflection and control. The mirrors can not only be switched between two states, their rotation is in fact continuous and either linear, wherein the angular sweep is constant or resonant, wherein the angular sweep is sinusoidal. Thus, they can be used to control the intensity and direction of incident light. A MEMS scanning micromirror generally consists of a silicon device with a millimeter-scale mirror at the center. The mirror is typically connected to flexures that allow it to oscillate on a single axis or biaxially, to project or capture light. A primary advantage of using a MEMS device for the beam steering device 68 is that MEMS devices are very fast, allowing the direction of re-directed incident light to be changed very rapidly.

The system 11 further includes an audio communication system 114 adapted to support audible communication between the vehicle 10 and the person 50. The audio communication system 114 includes a directional speaker 116 in communication with the system controller 34A and adapted to provide audio output directed to the person 50, as indicated by arrow 118. The audio communication system 114 further includes an audio compute engine 120 in communication with the monitoring system 52, the audio compute engine 120 adapted to use a visual speech recognition algorithm 122 in communication with data received from the monitoring system 52 to visually interpret verbal communications received from the person 50. The visual speech recognition algorithm 122 detects spoken words of the person 50 by tracking the person's 50 lip movements, and uses machine learning techniques to recognize speech from the person 50 in real time. Finally, the audio communication system 114 includes a microphone 124 in communication with the system controller 34A and adapted to receive verbal communications from the person 50, as indicated by arrow 126.

Referring again to FIG. 4, in an exemplary embodiment, the holographic image 58 comprises a single two-dimensional holographic image 58. The single two-dimensional holographic image 58 is a large image, such that the beam steering device 68 is adapted to re-direct the single two-dimensional holographic image directly to both a right eye 78R of the person 50 and a left eye 78L of the person 50 simultaneously, wherein the person 50 perceives the two-dimensional holographic image 58 floating in front of the person 50, between the vehicle 10 and the person 50 and at the appropriate distance 64 from the person 50.

Referring to FIG. 5, in another exemplary embodiment, the holographic image 58 comprises a single two-dimensional holographic image, and the beam steering device 68 is adapted to alternately re-direct the single two-dimensional holographic image 58 directly to only a right eye 78R of the person 50, as indicated by arrow 82, and then only to a left eye 78L of the person 50, as indicated by arrow 84, switching back and forth between the right eye 78R and the left eye 78L at a frequency greater than 30 Hz. This is known as sequential time-multiplexing. Sequential time-multiplexing requires the beam steering device 68 to be capable of switching the direction of the re-directed holographic image 58, back and forth between the right eye 78R and the left eye 78L, fast enough to eliminate any perceptible image flicker by the viewing person 50.

In an exemplary embodiment, the beam steering device 68 is adapted to sequentially re-direct the holographic image 58 to the right eye 78R, as indicated by arrow 82, for less than 33 μs. After 33 μs, the beam steering device 68 adjusts, and begins re-directing the holographic image 58 to the left eye 78L, as indicated by arrow 84. The holographic image 58 is re-directed to the left eye 78L for less than 33 μs. This process is repeated, by alternating between re-directing the holographic image 58 to the right eye 78R for less than 33 μs, and re-directing the holographic image 58 to the left eye 78L for less than 33 μs.

If the frequency of switching between re-directing the holographic image 58 to the right eye 78R and the left eye 78L is greater than 30 Hz, flicker will not be perceptible by the person 50, and the holographic image 58 perceived by the right eye 78R and the left eye 78L of the person 50 will be fused into one image, as perceived by the person 50. A frequency of 30 Hz translates to switching between the right eye 78R and the left eye 78L every 33 μs. For this embodiment, a MEMS beam steering device 68 will work. Gimble or galvo-based beam steering devices 68 are not able to switch the direction of re-direction fast enough to avoid the person 50 being conscious of the switch. A MEMS beam steering device 68, by way of non-limiting example, is capable of switching fast enough that the person 50 will not be aware of the switch, and will perceive that they are seeing the holographic image 58 simultaneously with both the right eye 78R and the left eye 78L. Any beam steering device 68, such as a fast-scanning mirror system, that is capable of switching fast enough is suitable for this application.

Figure 6:
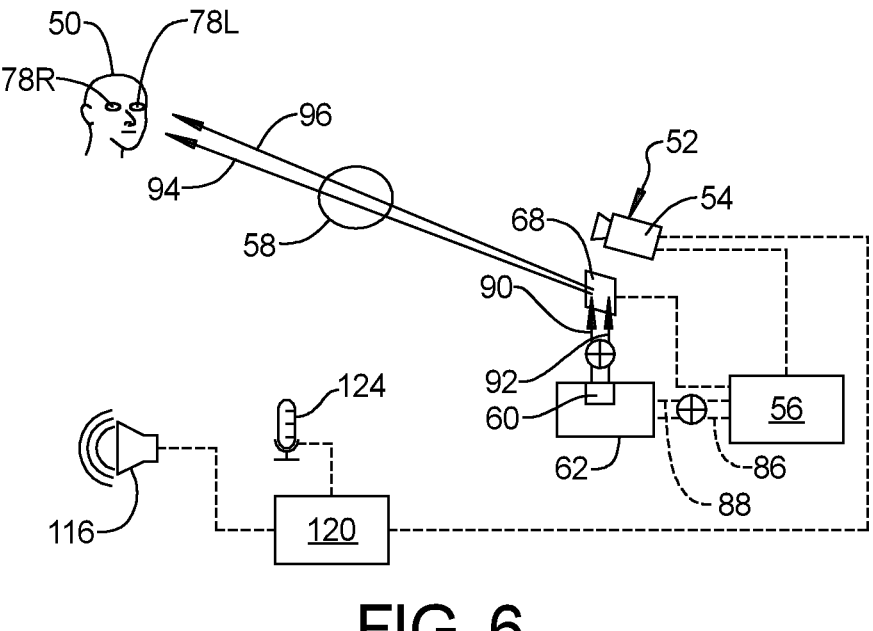
FIG. 6 is a schematic view of a system according to an exemplary embodiment wherein a compute engine is adapted to encode a right eye image and a left eye image to a display.

Referring to FIG. 6, in another exemplary embodiment, the holographic image 58 includes a right-eye image and a left-eye image. The visual compute engine 56 is adapted to calculate the right-eye image and the left-eye image and to alternately encode the right-eye image onto the display 60, as shown by line 86, and to encode the left-eye image onto the display 60, as shown by line 88, switching back and forth between encoding the right-eye image and encoding the left-eye image at a frequency greater than 30 Hz.

The display 60 is adapted to project, alternately, at a frequency greater than 30 Hz and in sync with the visual compute engine 56, the right-eye image to the beam steering device 68, as indicated by arrow 90, and the left-eye image to the beam steering device 68, as indicated by arrow 92. The display 60 is in sync with the visual compute engine 56, wherein, when the visual compute engine 56 is encoding the right eye image to the display 60, as indicated by line 86, the display 60 is projecting the right eye image to the beam steering device 68, as indicated by arrow 90, and, when the visual compute engine 56 is encoding the left eye image to the display 60, as indicated by line 88, the display 60 is projecting the left eye image to the beam steering device 68, as indicated by arrow 92.

The beam steering device 68 is adapted to, alternately, at a frequency greater than 30 Hz and in sync with the visual compute engine 56 and the display 60, re-direct the right-eye image directly to the right eye 78R of the person 50, as indicated by arrow 94, and, to re-direct the left-eye image directly to the left eye 78L of the person 50, as indicated by arrow 96. The right-eye image and the left-eye image are slightly different perspectives of a single image such that when the right eye 78R of the person 50 receives the right-eye image and the left eye 78L of the person 50 receives the left-eye image, the person 50 perceives a three-dimensional holographic image 58 floating in front of the person 50.

This provides an autostereoscopic three-dimensional display by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

The beam steering device 68 is in sync with the display 60 and the visual compute engine 56, wherein, when the visual compute engine 56 is encoding the right eye image to the display 60, as indicated by line 86, the display 60 is projecting the right eye image to the beam steering device 68, as indicated by arrow 90, and the beam steering device 68 is re-directing the right eye image to the right eye 78R of the person 50, as indicated by arrow 94. Further, when the visual compute engine 56 is encoding the left eye image to the display 60, as indicated by line 88, the display 60 is projecting the left eye image to the beam steering device 68, as indicated by arrow 92, and the beam steering device 68 is re-directing the left eye image to the left eye 78L of the person 50, as indicated by arrow 96.

For this embodiment, a MEMS beam steering device 68, by way of non-limiting example, is capable of switching fast enough that the person 50 will not be aware of the switch, and will perceive that they are seeing the right eye image and the left eye image simultaneously with both the right eye 78R and the left eye 78L, and will fuse the right eye image and the left eye image into the perceived three-dimensional holographic image 58 floating in front of the person 50.

Figure 7:
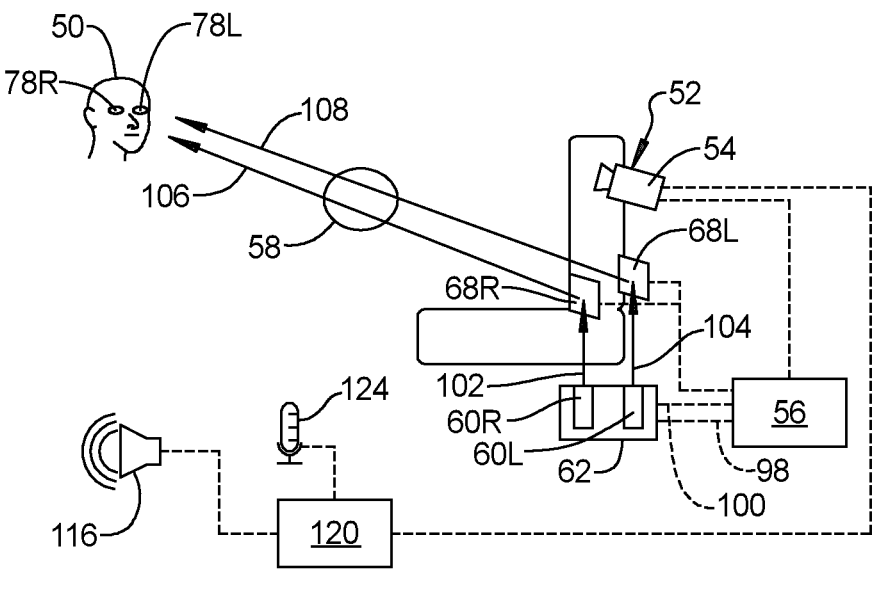
FIG. 7 is a schematic view of a system according to an exemplary embodiment including a right eye display, a left eye display, a right eye beam steering device, and a left eye beam steering device.

Referring to FIG. 7, in another exemplary embodiment, the holographic image 58 includes a right-eye image and a left-eye image, the display 60 includes a right-eye display 60R and a left-eye display 60L, and the beam steering device 68 includes a right-eye mirror 68R and a left-eye mirror 68L.

The visual compute engine 56 is adapted to calculate the right-eye image and the left-eye image and to simultaneously encode the right-eye image onto the right-eye display 60R, as shown by line 98, and to encode the left-eye image onto the left-eye display 60L, as shown by line 100. The right-eye display 60R and the left-eye display 60L are adapted to project, simultaneously, the right-eye image to the right-eye mirror 68R, as indicated by arrow 102, and the left-eye image to the left-eye mirror 68L, as indicated by arrow 104.

Both the right eye mirror 68R and the left eye mirror 68L may be, by way of non-limiting example, a gimble mounted reflector, a MEMS device, or any other suitable beam steering mechanism. The right-eye mirror 68R is adapted to re-direct the right-eye image directly to the right eye 78R of the person 50, as indicated by arrow 106, and, simultaneously, the left-eye mirror 68L is adapted to re-direct the left-eye image directly to the left eye 78L of the person 50, as indicated by arrow 108, wherein the right-eye image and the left-eye image are slightly different perspectives of a single image such that when the right eye 78R of the person 50 receives the right-eye image and the left eye 78L of the person 50 receives the left-eye image, the person's right eye 78R and left eye 78L will fuse the right eye image and the left eye image into the perceived three-dimensional holographic image 58 floating in front of the person 50. In another exemplary embodiment, the right eye image and the left eye image are the same image, and thus, the person 50 perceives a two-dimensional holographic image 58 floating in front of the person 50.

Figure 8:
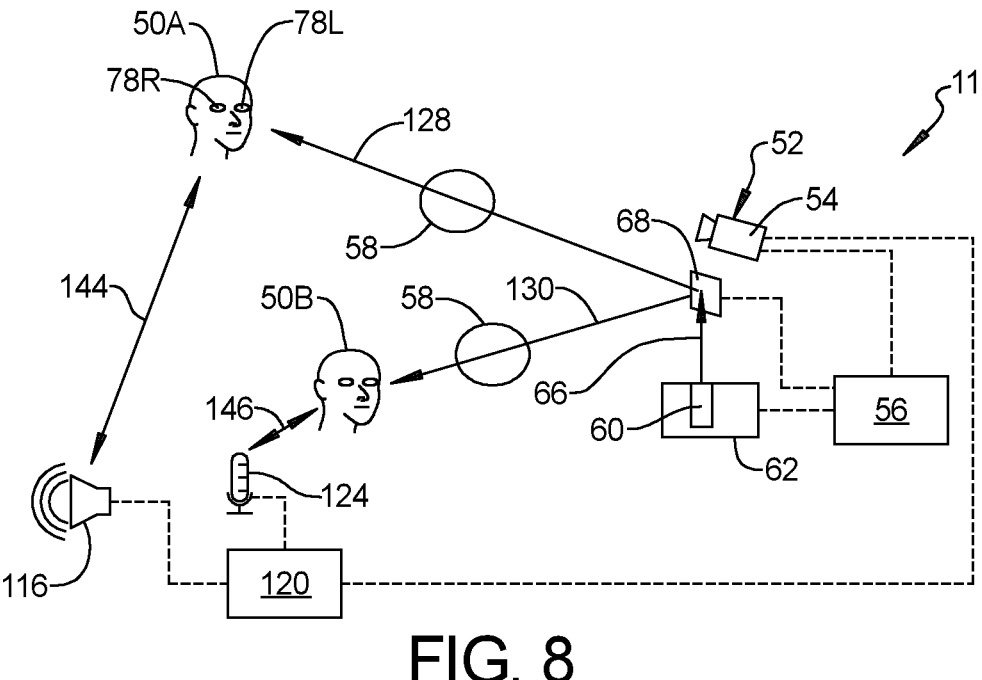
FIG. 8 is a schematic view of a system according to an exemplary embodiment wherein the beam splitting device alternately re-directs a holographic image projected by an display between a first person and a second person.

Referring to FIG. 8, in another exemplary embodiment, the beam steering device 68 is adapted to alternately re-direct the holographic image 58 directly to only a first person 50A within proximity of the vehicle 10, as indicated by arrow 128, and then only to a second person 50B within proximity of the vehicle 10, as indicated by arrow 130, switching back and forth between the first person 50A and the second person 50B at a frequency greater than 30 Hz. This is known as sequential time-multiplexing. Sequential time-multiplexing requires the beam steering device 68 to be capable of switching the direction of the re-directed holographic image 58, back and forth between the first person 50A and the second person 50B, fast enough to eliminate any perceptible image flicker by the viewing first person 50A and second person 50B.

It is possible for the system, using sequential time-multiplexing to project images to more than two persons at a time. The controlling factor is the frame rate capability of the holographic image generator 55. At 200-250 frames per second, the system may be able to support time-multiplexing images to up to three or four individual persons, with each person 50 perceiving a continuous steady image floating in front of them. Higher frame rates would support time-multiplexing to more individuals.

In an exemplary embodiment, the beam steering device 68 is adapted to sequentially re-direct the holographic image 58 to the first person 50A, as indicated by arrow 128, for less than 33 µs. After 33 µs, the beam steering device 68 adjusts, and begins re-directing the holographic image 58 to the second person 50B, as indicated by arrow 130. The holographic image 58 is re-directed to the second person 50B for less than 33 µs. This process is repeated, by alternating between re-directing the holographic image 58 to the first person 50A for less than 33 µs, and re-directing the holographic image 58 to the second person 50B for less than 33 µs.

If the frequency of switching between re-directing the holographic image 58 to first person 50A and the second person 50B is greater than 30 Hz, flicker will not be perceptible by the first person 50A and the second person 50B. As described above, for this embodiment, a MEMS beam steering device 68 will work.

The audio communication system 114 is adapted to alternately support audible communication between the vehicle 10 and the first person 50A, as indicated by arrow 144 and then support audible communication between the vehicle 10 and the second person 50B, as indicated by arrow 146, switching back and forth between audible communication with the first person 50A and audible communication with the second person 50B at a frequency fast enough to provide for simultaneous, directional an discrete communication with multiple persons 50.

It is further possible to incorporate multiple holographic image generators 55 in the system 11 to allow the system 11 to support communication between the vehicle 10 and multiple individual persons. As mentioned above, time-multiplexing allows a single holographic image generator 55 to project images to multiple individual persons. Use of multiple holographic image generators would further expand the number of individual persons that the system could support communication with simultaneously.

Figure 9:
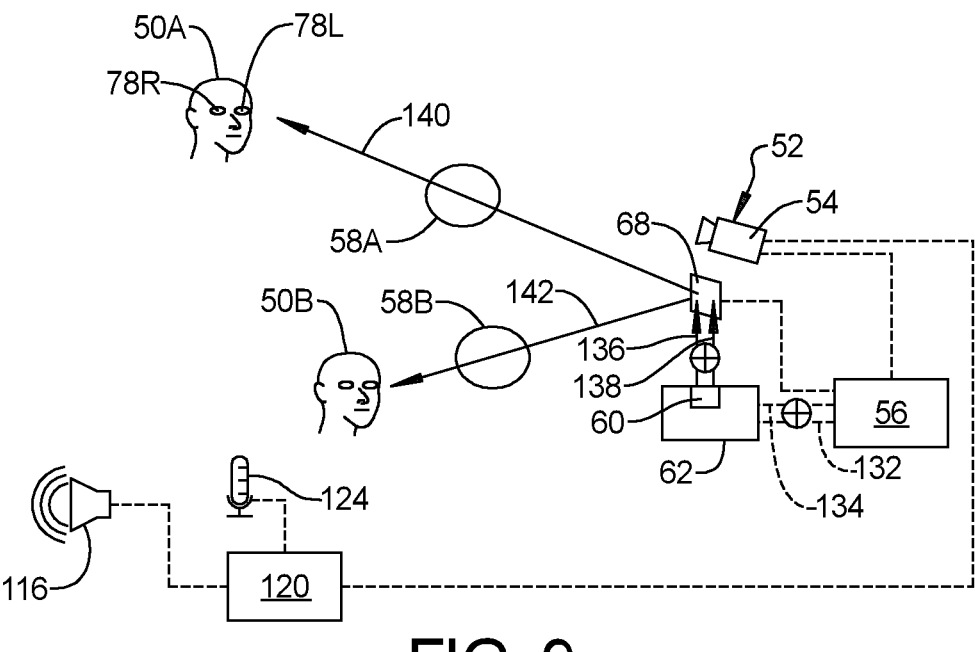
FIG. 9 is a schematic view of a system according to an exemplary embodiment wherein the display alternately projects a first image and a second image to an display which alternately re-directs the first image to a first person and re-directs the second image to a second person.
Figure 10:
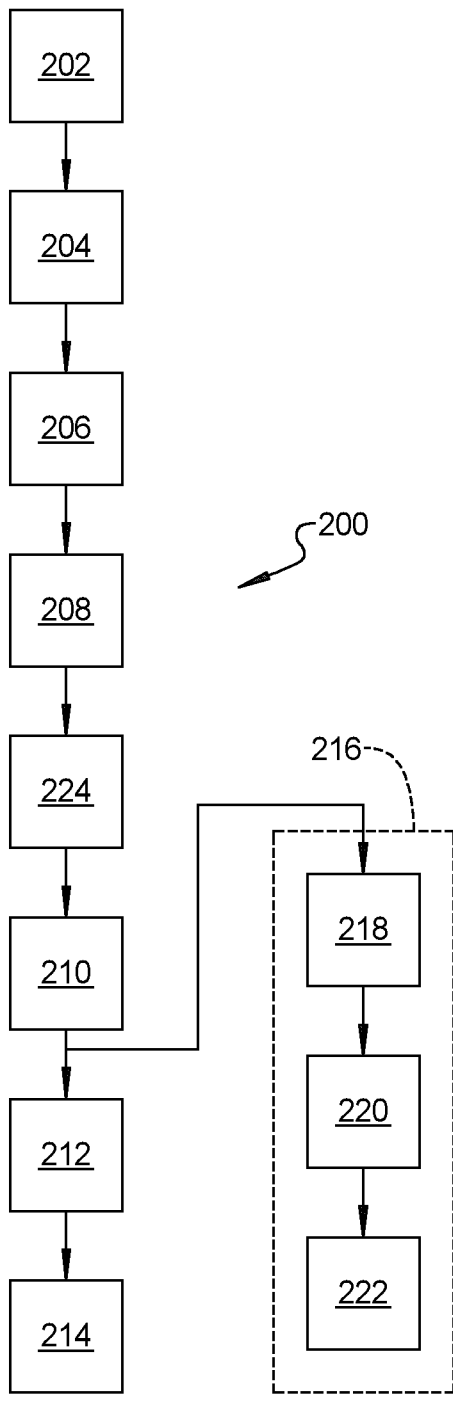
FIG. 10 is a schematic flow chart illustrating a method according to an exemplary embodiment of the present disclosure.

Referring to FIG. 9, in another exemplary embodiment, the holographic image 58 includes a first image 58A and a second image 58B. The visual compute engine 56 is adapted to calculate the first image 58A and the second image 58B and to alternately encode the first image 58A to the display 60, as shown by line 132, and to encode the second image 58B to the display 60, as shown by line 134, switching back and forth between encoding the first image 58A and encoding the second image 58B at a frequency greater than 30 Hz.

The display 60 is adapted to project, alternately, at a frequency greater than 30 Hz and in sync with the visual compute engine 56, the first image 58A to the beam steering device 68, as indicated by arrow 136, and the second image 58B to the beam steering device 68, as indicated by arrow 138. The display 60 is in sync with the visual compute engine 56, wherein, when the visual compute engine 56 is encoding the first image 58A to the display 60, as indicated by line 132, the display 60 is projecting the first image 58A to the beam steering device 68, as indicated by arrow 136, and, when the visual compute engine 56 is encoding the second image 58B to the display 60, as indicated by line 134, the display 60 is projecting the second image 58B to the beam steering device 68, as indicated by arrow 138.

The beam steering device 68 is adapted to, alternately, at a frequency greater than 30 Hz and in sync with the visual compute engine 56 and the display 60, re-direct the first image 58A directly to the first person 50A, as indicated by arrow 140, and, to re-direct the second image 58B directly to the second person 50B, as indicated by arrow 142.

The beam steering device 68 is in sync with the display 60 and the visual compute engine 56, wherein, when the visual compute engine 56 is encoding the first image 58A to the display 60, as indicated by line 132, the display 60 is projecting the first image 58A to the beam steering device 68, as indicated by arrow 136, and the beam steering device 68 is re-directing the first person image 58A to the first person 50A, as indicated by arrow 140. Further, when the visual compute engine 56 is encoding the second image 58B to the display 60, as indicated by line 134, the display 60 is projecting the second image 58B to the beam steering device 68, as indicated by arrow 138, and the beam steering device 68 is re-directing the second image 58B to the second person 50B, as indicated by arrow 142.

For this embodiment, a MEMS beam steering device 68, by way of non-limiting example, is capable of switching fast enough that the first person 50A and the second person 50B will not be aware of the alternating.

The system 11 described herein offers the advantage of allowing a vehicle 10 to communicate, directly and privately, with a targeted individual, wherein the image projected is only visible by the targeted individual and audible messages are directed, with a directional speaker 116, to the targeted individual, wherein the audible messages are only heard by the targeted individual. The system 11 can be located at various positions on the vehicle 10, and a vehicle 10 with multiple holographic image generators 55 and multiple audio communication systems 114 located at the front, sides and rear of the vehicle 10 facilitate communication with persons located in front of, next to and behind the vehicle 10. Possible use cases for the system 11 include, but are not limited to: communication between a taxi cab or a police vehicle and passengers/pedestrians standing on a curb or sidewalk adjacent a roadway, communication between an autonomous vehicle and pedestrians, communications such as exchange of credentials at an entrance gate or guard checkpoint.

Referring to FIG. 8, a method 200 of generating a floating image for a person 50 within a vehicle 10, includes, starting at block 202, detecting, with a perception system 38 in communication with a system controller 34A, the presence of a person 50 in proximity to the vehicle 10, moving to block 204, monitoring, with a monitoring system 52, the position of the person's 50 head and eyes, moving to block 206, calculating, with a visual compute engine 56 of a holographic image generator 55 in communication with the monitoring system 52, a holographic image 58 and, moving to block 208, encoding the holographic image 58 to a display 60 of a picture generating unit (PGU) 62.

Moving to block 210, the method 200 further includes, receiving, with a beam steering device 68, via the visual compute engine 56, information related to a position of the person's 50 head and eyes from the monitoring system 52, and, moving to block 212, projecting, with the display 60, the holographic image 58 to the beam steering device 68, and, moving to block 214, re-directing, with the beam steering device 68, the projected holographic image 58 to the eyes 78R, 78L of the person 50, based on the information received from the monitoring system 52.

In an exemplary embodiment, the method 200 further includes, moving to block 216, supporting audible communication between the vehicle 10 and the person 50 with an audio communication system 114 by, moving to block 218, providing audio output directed to the person 50 with a directional speaker 116 in communication with the system controller 34A, moving to block 220, using, with an audio compute engine 120 in communication with the monitoring system 52, a visual speech recognition algorithm 122 in communication with data received from the monitoring system 52 and visually interpreting verbal communications from the person 50, and, moving to block 222, receiving, with a microphone 124 in communication with the system controller 34A, verbal communications from the person 50.

In an exemplary embodiment, the method 200 further includes, moving to block 224, encoding, with the visual compute engine 56, a lens function into the holographic image 58 based on information received from the monitoring system 52.

In another exemplary embodiment, the calculating, with the visual compute engine 56, the holographic image 58 at block 206 further includes, calculating, with the visual compute engine 56, a single two-dimensional holographic image, and the re-directing, with the beam steering device 68, the projected holographic image 58 to the eyes 78R, 78L of the person 50 at block 214 further includes, re-directing, with the beam steering device 68, the single two-dimensional holographic image directly to both a right eye 78R of the person and a left eye 78L of the person 50 simultaneously, wherein the person 50 perceives the two-dimensional holographic image floating in front of the person 50.

In another exemplary embodiment, the calculating, with the visual compute engine 56, the holographic image 58 at block 206 further includes, calculating, with the visual compute engine 56, a single two-dimensional holographic image, and the re-directing, with the beam steering device 68, the projected holographic image 58 to the eyes 78R, 78L of the person 50 at block 214 further includes, alternately re-directing, with the beam steering device 68, the single two-dimensional holographic image directly to only a right eye 78R of the person 50 and then only to a left eye 78L of the person 50, switching back and forth between the right eye 78R and the left eye 78L at a frequency greater than 30 Hz, wherein the person 50 perceives the two-dimensional holographic image 58 floating in front of the person 50.

In another exemplary embodiment, the holographic image 58 includes a right-eye image and a left-eye image, and the calculating, with the visual compute engine 56, the holographic image 58 at block 206 further includes, calculating, with the visual compute engine 56, the right-eye image and the left-eye image. The encoding the holographic image 58 to the display 60 of the picture generating unit (PGU) hologram generator 62 at block 208 further includes alternately encoding, with the visual compute engine 56, the right-eye image onto the display 60 and encoding, with the visual compute engine 56, the left-eye image onto the display 60, and switching back and forth between encoding the right-eye image and encoding the left-eye image at a frequency greater than 30 Hz. The projecting, with the display 60, the holographic image 58 to the beam steering device 68 at block 212 further includes projecting, alternately, at a frequency greater than 30 Hz and in sync with the visual compute engine 56, the right-eye image and the left-eye image to the beam steering device 68. The re-directing, with the beam steering device 68, the projected holographic image 58 to the eyes 78R, 78L of the person 50 at block 214 further includes alternately, at a frequency greater than 30 Hz and in sync with the visual compute engine 56 and the display 60, re-directing, with the beam steering device 68, the right-eye image directly to the right eye 78R of the person 50 and re-directing, with the beam steering device 68, the left-eye image directly to the left eye 78L of the person 50, wherein the right-eye image and the left-eye image are slightly different perspectives of a single image such that when the right eye 78R of the person 50 receives the right-eye image and the left eye 78L of the person 50 receives the left-eye image, the person 50 perceives a three-dimensional image floating in front of the person 50.

In another exemplary embodiment, the holographic image 58 includes a right-eye image and a left-eye image, the display 60 includes a right-eye display 60R and a left-eye display 60L, and the beam steering device 68 includes a right-eye mirror 68R and a left-eye mirror 68L. The calculating, with the visual compute engine 56, the holographic image 58 at block 206 further includes calculating, with the visual compute engine 56, the right-eye image and the left-eye image. The encoding the holographic image 58 to the display 60 of the picture generating unit (PGU) 62 at block 208 further includes simultaneously encoding, with the visual compute engine 56, the right-eye image onto the right-eye display 60R and encoding, with the visual compute engine 56, the left-eye image onto the left-eye display 60L. The projecting, with the display 60, the holographic image 58 to the beam steering device 68 at block 212 further includes simultaneously projecting, with the right-eye display 60R and the left-eye display 60L, the right-eye image to the right-eye mirror 68R and the left-eye image to the left-eye mirror 68L. The re-directing, with the beam steering device 68, the projected holographic image 58 to the eyes 78R, 78L of the person 50 at block 214 further includes re-directing, simultaneously, with the right-eye mirror 68R, the right-eye image directly to the right eye 78R of the person 50, and, directing, with the left-eye mirror 68L, the left-eye image directly to the left eye 78L of the person 50, wherein the right-eye image and the left-eye image are slightly different perspectives of a single image such that when the right eye 78R of the person 50 receives the right-eye image and the left eye 78L of the person 50 receives the left-eye image, the person 50 perceives a three-dimensional image floating in front of the person 50.

In another exemplary embodiment, the re-directing, with the beam steering device 68, the projected holographic image 58 to the eyes of the person 50 at block 214 further includes alternately, at a frequency greater than 30 Hz and in sync with the visual compute engine 56 and the display 60, re-directing, with the beam steering device 68, the holographic image 58 only to a first person 50A within proximity of the vehicle 10 and then only to a second person 50B within proximity of the vehicle 10, switching back and forth between the first person 50A and the second person 50B at a frequency greater than 30 Hz. The supporting audible communication between the vehicle 10 and the person 50 with the audio communication system 114 at block 216 further includes alternately supporting audible communication between the vehicle 10 and the first person 50A and then supporting audible communication between the vehicle 10 and the second person 50B, switching back and forth between supporting audible communication with the first person 50A and supporting audible communication with the second person 50B at a frequency greater than 30 Hz.

In another exemplary embodiment, the holographic image 58 includes a first image 58A and a second image 58B, and the calculating, with the visual compute engine 56, the holographic image 58 at block 206 further includes, calculating, with the visual compute engine 56, the first image 58A and the second image 58B. The encoding the holographic image 58 to the display 60 of the picture generating unit (PGU) 62 at block 208 further includes alternately encoding, with the visual compute engine 56, the first image 58A onto the display 60 and encoding, with the visual compute engine 56, the second image 58B onto the display 60, and switching back and forth between encoding the first image 58A and encoding the second image 58B at a frequency greater than 30 Hz. The projecting, with the display 60, the holographic image 58 to the beam steering device 68 at block 212 further includes projecting, alternately, at a frequency greater than 30 Hz and in sync with the visual compute engine 56, the first image 58A and the second image 58B to the beam steering device 68. The re-directing, with the beam steering device 68, the projected holographic image 58 to the eyes of the person 50 at block 214 further includes alternately, at a frequency greater than 30 Hz and in sync with the visual compute engine 56 and the display 60, re-directing, with the beam steering device 68, the first image 58A directly to a first person 50A in proximity to the vehicle 10 and re-directing, with the beam steering device 68, the second image 58B directly to a second person 50B in proximity to the vehicle 10.

A system 11 and method 200 of the present disclosure offers several advantages. These include supporting two-way visual and audible communication between the vehicle 10 and a targeted person 50.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system within a vehicle for communicating with at least one person in proximity to the vehicle, comprising:
   a perception system in communication with a system controller, the perception system adapted to detect a presence of the at least one person in proximity to the vehicle;
   a monitoring system in communication with the system controller and adapted to monitor a position of the at least one person's head and eyes;
   a holographic image generator including:
   a visual compute engine in communication with the system controller and the monitoring system and adapted to calculate a holographic image and encode the holographic image to a display of a picture generating unit (PGU); and
   a beam steering device, wherein:
   the beam steering device is adapted to receive, via the visual compute engine, information related to the position of the at least one person's head and eyes from the monitoring system; and
   the display is adapted to, based on the information received from the monitoring system, project the holographic image to the beam steering device and the beam steering device is adapted to alternately re-direct the projected holographic image only to the eyes of a first one of the at least one person and then only to a second one of the at least one person, switching back and forth between the first one of the at least one person and the second one of the at least one person at a frequency greater than 30 Hz, wherein the first one of the at least one person perceives the holographic image floating in front of the first one of the at least one person and, simultaneously, the second one of the at least one person perceives the holographic image floating in front of the second one of the at least one person.

2. The system of claim 1 further including an audio communication system adapted to support audible communication between the vehicle and the at least one person and including:

a directional speaker in communication with the system controller and adapted to provide audio output directed to the at least one person;

an audio compute engine in communication with the monitoring system, the audio compute engine adapted to use a visual speech recognition algorithm in communication with data received from the monitoring system to visually interpret verbal communications from the at least one person; and a microphone in communication with the system controller and adapted to receive verbal communications from the at least one person.

3. The system of claim 2, wherein the visual compute engine is further adapted to encode a lens function into the holographic image based on information received from the monitoring system.

4. The system of claim 3, wherein the holographic image comprises a single two-dimensional holographic image, and the beam steering device is adapted to re-direct the single two-dimensional holographic image directly to both a right eye of the at least one person and a left eye of the at least one person simultaneously, wherein the at least one person perceives the two-dimensional holographic image floating within the vehicle in front of the at least one person.

5. The system of claim 3, wherein the holographic image comprises a single two-dimensional holographic image, and the beam steering device is adapted to alternately re-direct the single two-dimensional holographic image directly to only a right eye of the at least one person and then only to a left eye of the at least one person, switching back and forth between the right eye and the left eye at a frequency greater than 30 Hz, wherein the at least one person perceives the two-dimensional holographic image floating in front of the person.

6. The system of claim 3, wherein:

the holographic image includes a right-eye image and a left-eye image, the visual compute engine is adapted to calculate the right-eye image and the left-eye image and to alternately encode the right-eye image onto the display and encode the left-eye image onto the display, switching back and forth between encoding the right-eye image and encoding the left-eye image at a frequency greater than 30 Hz;

the display is adapted to project, alternately, at a frequency greater than 30 Hz and in sync with the visual compute engine, the right-eye image and the left-eye image to the beam steering device; and the beam steering device is adapted to, alternately, at a frequency greater than 30 Hz and in sync with the visual compute engine and the display, re-direct the right-eye image directly to a right eye of the at least one person and re-direct the left-eye image directly to a left eye of the at least one person, wherein the right-eye image and the left-eye image are slightly different perspectives of a single image such that when the right eye of the at least one person receives the right-eye image and the left eye of the at least one person receives the left-eye image, the at least one person perceives a three-dimensional image floating in front of the at least one person.

7. The system of claim 3, wherein the beam steering device is one of a microelectromechanical systems (MEMS) mirror, a two galvanometer mirror, a rotating Risley prism pair or a one-dimensional scam mirror in combination with a rotating polygon mirror.

8. The system of claim 3, wherein:

the holographic image includes a right-eye image and a left-eye image;

the display includes a right-eye display and a left-eye display;

the beam steering device includes a right-eye mirror and a left-eye mirror;

the visual compute engine is adapted to calculate the right-eye image and the left-eye image and to simultaneously encode the right-eye image onto the right-eye display and encode the left-eye image onto the left-eye display;

the right-eye display and the left-eye display are adapted to project, simultaneously, the right-eye image to the right-eye mirror and the left-eye image to the left-eye mirror; and the right-eye mirror is adapted to re-direct the right-eye image directly to the right eye of the at least one person, and, simultaneously, the left-eye mirror is adapted to re-direct the left-eye image directly to the left eye of the at least one person, wherein the right-eye image and the left-eye image are slightly different perspectives of a single image such that when the right eye of the at least one person receives the right-eye image and the left eye of the at least one person receives the left-eye image, the at least one person perceives a three-dimensional image floating in front of the at least one person.

9. The system of claim 3, wherein the audio communication system is adapted to alternately support audible communication between the vehicle and the first one of the at least one person and then support audible communication between the vehicle and the second one or the at least one person, switching back and forth between audible communication with the first one of the at least one person and audible communication with the second one of the at least one person.

10. The system of claim 3, wherein:

the holographic image includes a first image and a second image, the visual compute engine is adapted to calculate the first image and the second image and to alternately encode the first image onto the display and encode the second image onto the display, switching back and forth between encoding the first image and encoding the second image at a frequency greater than 30 Hz;

the display is adapted to project, alternately, at a frequency greater than 30 Hz and in sync with the visual compute engine, the first image and the second image to the beam steering device; and the beam steering device is adapted to, alternately, at a frequency greater than 30 Hz and in sync with the visual compute engine and the display, re-direct the first image directly to the first one of the at least one person within proximity of the vehicle and re-direct the second image directly to the second one of the at least one person within proximity of the vehicle.

11. A method of communicating with at least one person in proximity to a vehicle, comprising:

detecting, with a perception system in communication with a system controller, a presence of the at least one person in proximity to the vehicle;

monitoring, with a monitoring system, a position of the at least one person's head and eyes;

calculating, with a visual compute engine of a holographic image generator in communication with the monitoring system, a holographic image and encoding the holographic image to a display of a picture generating unit (PGU);

receiving, with a beam steering device, via the visual compute engine, information related to the position of the at least one person's head and eyes from the monitoring system; and projecting, with the display, based on the information received from the monitoring system, the holographic image to the beam steering device, and, alternately, at a frequency greater than 30 Hz and in sync with the visual compute engine and the display, re-directing, with the beam steering device, the projected holographic image only to the eyes of a first one of the at least one person and then only to a second one of the at least one person within proximity of the vehicle, switching back and forth between the first one of the at least one person and the second one of the at least one person at a frequency greater than 30 Hz.

12. The method of claim 11 further including supporting audible communication between the vehicle and the at least one person with an audio communication system by:

providing audio output directed to the at least one person with a directional speaker in communication with the system controller;

using, with an audio compute engine in communication with the monitoring system, a visual speech recognition algorithm in communication with data received from the monitoring system and visually interpreting verbal communications from the at least one person; and receiving, with a microphone in communication with the system controller, verbal communications from the at least one person.

13. The method of claim 12, further including encoding, with the visual compute engine, a lens function into the holographic image based on information received from the monitoring system.

14. The method of claim 13, wherein the calculating, with the visual compute engine, the holographic image further includes, calculating, with the visual compute engine, a single two-dimensional holographic image;

the method including re-directing, with the beam steering device, the single two-dimensional holographic image directly to both a right eye of the at least one person and a left eye of the at least one person simultaneously, wherein the at least one person perceives the two-dimensional holographic image floating in front of the at least one person.

15. The method of claim 13, wherein the calculating, with the visual compute engine, the holographic image further includes, calculating, with the visual compute engine, a single two-dimensional holographic image;

the method including alternately re-directing, with the beam steering device, the single two-dimensional holographic image directly to only a right eye of the at least one person and then only to a left eye of the at least one person, switching back and forth between the right eye and the left eye at a frequency greater than 30 Hz, wherein the at least one person perceives the two-dimensional holographic image floating in front of the at least one person.

16. The method of claim 13, wherein:

the holographic image includes a right-eye image and a left-eye image, and the calculating, with the visual compute engine, the holographic image further includes, calculating, with the visual compute engine, the right-eye image and the left-eye image;

the encoding the holographic image to the display of the picture generating unit (PGU) further includes alternately encoding, with the visual compute engine, the right-eye image onto the display and encoding, with the visual compute engine, the left-eye image onto the display, and switching back and forth between encoding the right-eye image and encoding the left-eye image at a frequency greater than 30 Hz;

the projecting, with the display, the holographic image to the beam steering device further includes projecting, alternately, at a frequency greater than 30 Hz and in sync with the visual compute engine, the right-eye image and the left-eye image to the beam steering device; and the method further including, alternately, at a frequency greater than 30 Hz and in sync with the visual compute engine and the display, re-directing, with the beam steering device, the right-eye image directly to the right eye of the at least one person and re-directing, with the beam steering device, the left-eye image directly to the left eye of the at least one person, wherein the right-eye image and the left-eye image are slightly different perspectives of a single image such that when the right eye of the at least one person receives the right-eye image and the left eye of the at least one person receives the left-eye image, the at least one person perceives a three-dimensional image floating in front of the at least one person.

17. The method of claim 13, wherein the holographic image includes a right-eye image and a left-eye image, the display includes a right-eye display and a left-eye display, and the beam steering device includes a right-eye mirror and a left-eye mirror, wherein:

the calculating, with the visual compute engine, the holographic image further includes calculating, with the visual compute engine, the right-eye image and the left-eye image;

the encoding the holographic image to the display of the picture generating unit (PGU) further includes simultaneously encoding, with the visual compute engine, the right-eye image onto the right-eye display and encoding, with the visual compute engine, the left-eye image onto the left-eye display;

the projecting, with the display, the holographic image to the beam steering device further includes simultaneously projecting, with the right-eye display and the left-eye display, the right-eye image to the right-eye mirror and the left-eye image to the left-eye mirror; and the method further including re-directing, simultaneously, with the right-eye mirror, the right-eye image directly to the right eye of the at least one person, and, directing, with the left-eye mirror, the left-eye image directly to the left eye of the at least one person, wherein the right-eye image and the left-eye image are slightly different perspectives of a single image such that when the right eye of the at least one person receives the right-eye image and the left eye of the at least one person receives the left-eye image, the at least one person perceives a three-dimensional image floating in front of the at least one person.

18. The method of claim 13, wherein the supporting audible communication between the vehicle and the at least one person with the audio communication system further includes alternately supporting audible communication between the vehicle and the first one of the at least one person and then supporting audible communication between the vehicle and the second one of the at least one person, switching back and forth between supporting audible communication with the first one of the at least one person and supporting audible communication with the second one of the at least one person.

19. The method of claim 13, wherein:

the holographic image includes a first image and a second image, and the calculating, with the visual compute engine, the holographic image further includes, calculating, with the visual compute engine, the first image and the second image;

the encoding the holographic image to the display of the picture generating unit (PGU) further includes alternately encoding, with the visual compute engine, the first image to the display and encoding, with the visual compute engine, the second image to the display, and switching back and forth between encoding the first image and encoding the second image at a frequency greater than 30 Hz;

the projecting, with the display, the holographic image to the beam steering device further includes projecting, alternately, at a frequency greater than 30 Hz and in sync with the visual compute engine, the first image and the second image to the beam steering device; and the method further includes alternately, at a frequency greater than 30 Hz and in sync with the visual compute engine and the display, re-directing, with the beam steering device, the first image directly to the first one of the at least one person in proximity to the vehicle and re-directing, with the beam steering device, the second image directly to the second one of the at least one person in proximity to the vehicle.

20. A vehicle having a system for communicating with at least one person in proximity to the vehicle, comprising:

a perception system in communication with a system controller, the perception system adapted to detect a presence of the at least one person in proximity to the vehicle;

a monitoring system in communication with the system controller and adapted to monitor a position of the at least one person's head and eyes;

a holographic image generator including:

a visual compute engine in communication with the system controller and the monitoring system and adapted to calculate a holographic image and encode the holographic image to a display of a picture generating unit (PGU) and to encode a lens function into the holographic image based on information received from the monitoring system; and a beam steering device, wherein:

the beam steering device is adapted to receive, via the visual compute engine, information related to the position of the at least one person's head and eyes from the monitoring system; and the display is adapted to, based on the information received from the monitoring system, project the holographic image to the beam steering device and the beam steering device is adapted to alternately re-direct the projected holographic image only to the eyes of a first one of the at least one person and then only to a second one of the at least one person, switching back and forth between the first one of the at least one person and the second one of the at least one person at a frequency greater than 30 Hz, wherein the first one of the at least one person perceives the holographic image floating in front of the first one of the at least one person and, simultaneously, the second one of the at least one person perceives the holographic image floating in front of the second one of the at least one person; and an audio communication system adapted to support audible communication between the vehicle and the person and including:

a directional speaker in communication with the system controller and adapted to provide audio output directed to the at least one person;

an audio compute engine in communication with the monitoring system, the audio compute engine adapted to use a visual speech recognition algorithm in communication with data received from the monitoring system to visually interpret verbal communications from the at least one person; and a microphone in communication with the system controller and adapted to receive verbal communications from the at least one person.

\* \* \* \* \*